US 6,557,759 B1

(12) United States Patent
Zolotarev et al.

(10) Patent No.: US 6,557,759 B1
(45) Date of Patent: May 6, 2003

(54) METHOD ENABLING A PURCHASER TO ASK FOR THE EXECUTION OF AN OBLIGATION RELATED TO A CARD AND ENABLING AN EMITTER TO RECOGNIZE SAID OBLIGATION

(76) Inventors: Oleg Anatolievich Zolotarev, 25-20 ul. Molodezhnaya, 188537 Sosnovy Bor Leningradskoi obl. (RU); Ivan Vladimirovich Kuznetsov, 48-56 ul. Saltykova-Schedrina, 191123 ST. Petersburg (RU); Andrei Gennadievich Moshonkin, 44-A-5 ul. Shpalernaya, 191123 St. Petersburg (RU); Alexandr Leonidovich Smirnov, 36-8 ul. Dostoevskogo, 191126 St. Petersburg (RU); Ildar Magafurovich Khamitov, 29-2-45 ul. Babushkina, 193029 St. Petersburg (RU)

( * ) Notice: Subject to any disclaimer, the term of this patent is extended or adjusted under 35 U.S.C. 154(b) by 0 days.

(21) Appl. No.: 09/913,138
(22) PCT Filed: Feb. 16, 2000
(86) PCT No.: PCT/RU00/00053
§ 371 (c)(1),
(2), (4) Date: Aug. 9, 2001
(87) PCT Pub. No.: WO00/49514
PCT Pub. Date: Aug. 24, 2000

(30) Foreign Application Priority Data

Feb. 17, 1999 (RU) .......................................... 99102803

(51) Int. Cl.[7] ................................................ G06K 5/00
(52) U.S. Cl. ........................................ 235/380; 235/382
(58) Field of Search ................................. 235/379, 380, 235/375, 381, 382, 492; 705/14, 26, 27, 39; 340/825

(56) References Cited

U.S. PATENT DOCUMENTS

| | | | | | |
|---|---|---|---|---|---|
| 5,295,188 A | * | 3/1994 | Wilson et al. | ............... | 235/379 |
| 5,818,019 A | * | 10/1998 | Irwin et al. | .................. | 235/375 |
| 5,988,509 A | * | 11/1999 | Taskett | ........................ | 235/379 |
| 6,138,106 A | * | 10/2000 | Walker et al. | ............... | 235/381 |

* cited by examiner

Primary Examiner—Karl D. Frech
Assistant Examiner—Edwyn Labaze
(74) Attorney, Agent, or Firm—Henry M. Feiereisen

(57) ABSTRACT

A method for a cardholder to request fulfillment of an obligation associated with the card and for the issuer to acknowledge this obligation, which method allows a remote interaction of the parties and ensures their security. The issuer issues cards each of which has an identifier and the corresponding verifier, the latter being concealed by a masking device. A cardholder sends the identifier of the card and directions specifying fulfillment of the obligation to the issuer. The issuer checks that he has never issued to anybody a signed reply binding the presented identifier and directions different from the presented directions, signs the reply binding the identifier and the directions, and sends the signed reply to the cardholder. The cardholder verifies the issuer's signature on the reply and checks that the reply binds the identifier and directions he has sent to the issuer, after which he sends the verifier of the card to the issuer. The issuer checks that the verifier corresponds to the identifier, after which he acknowledges the obligation that corresponds to the obligation associated with the card and the cardholder's directions. The invention can be used for selling goods and services, in lotteries, in banking and financing activities, and in other areas.

18 Claims, 2 Drawing Sheets

Lottery ticket

| | |
|---|---|
| Number | 18765 |
| Password | 27035D4B8C |
| Verifier | 554B07E2FE |

Fig. 4

Lottery ticket

| | |
|---|---|
| Number | 18765 |
| Password | ///////// |
| Verifier | ///////// |

Fig. 5

Lottery ticket

| | |
|---|---|
| Number | 18765 |
| Password | 27035D4B8C |
| Verifier | ///////// |

Fig. 6

METHOD ENABLING A PURCHASER TO ASK FOR THE EXECUTION OF AN OBLIGATION RELATED TO A CARD AND ENABLING AN EMITTER TO RECOGNIZE SAID OBLIGATION

TECHNICAL FIELD

The invention relates to verification of information media of card-type with which an issuer's obligations are associated, and more particularly to the methods for a cardholder to request fulfillment of an obligation associated with the card and for the issuer to acknowledge this obligation. The invention can be used for selling goods and services, in lotteries, in banking and financing activities, and in other areas.

BACKGROUND ART

The method of selling goods and services with the help of prepaid cards is well known in the business practice. The essence of this method is that the issuer issues special cards, associates with each of them an obligation of his and distributes the cards among cardholders. At some later time a cardholder can request the issuer to fulfill the obligation associated with the card. Utilization of this method can substantially expand the issuer's customer base, since the cards can be distributed in the places that are near to potential cardholders. Furthermore, acquiring the issuer's obligations via acquiring a card can be anonymous.

By a card is meant any suitable material medium with which the issuer's obligation is associated.

By an issuer of a card is meant an entity which issues cards, bears the responsibility for the obligations associated with them, and performs actions related to verification of the cards and acknowledgment of the obligations. In practice, the issuer may delegate part of his functions, for example, related to verification of the cards, to other entities. Moreover, the issuer can carry out some auxiliary actions itself or entrust their execution to other entities. Such auxiliary actions may include, for example, manufacturing the cards, distribution of cards among cardholders, fulfillment of the acknowledged obligations, etc.

A bank issuing one-time cards (bills) is an example of the issuer. Associated with each card is an obligation of the bank to deposit a certain sum of money in the account indicated by the cardholder. A lottery selling game tickets to the players is another example of the issuer. Associated with each ticket is an obligation of the lottery to give the prize won by the ticket in the drawing.

It would be convenient for the cardholder if he could request the issuer to fulfill the obligation associated with the card without producing the card to the issuer or to his representative. In this case the cardholder could interact with the issuer remotely via electronic means of communication. For example, the holder of a one-time bank card could request, without visiting the bank, that the sum indicated on the card be deposited in the account indicated by the cardholder. Similarly, the holder of a winning ticket, who is watching the lottery drawing on TV, could immediately request, without leaving the comforts of his home, that the prize be delivered to the address indicated by him or that the sum of the prize be deposited in his bank account.

It is also convenient for the issuer to have the possibility of a remote interaction with the cardholder, since this reduces overhead expenses needed for maintenance of offices and accompanying infrastructure, and expands the base of potential consumers of the goods and services offered by the issuer. For example, for an officeless Internet bank, the cards distributed through non-bank retail outlets, could serve as a channel of delivering money in the clients' accounts.

Before fulfilling an obligation, the issuer must acknowledge it, i.e., he must make sure that the received request for fulfillment of the obligation is legitimate.

Well-known is a conventional method for a cardholder to request fulfillment of an obligation associated with the card and for the issuer to acknowledge this obligation, which method allows a remote interaction between the cardholder and the issuer. The method consists in performing the following steps:

(1) the cardholder reads the identifier from the card and presents to the issuer a request for fulfillment of the obligation associated with the card, which request includes the identifier of the card and directions specifying fulfillment of the issuer's obligation;

(2) the issuer verifies the validity of the card using the identifier and directions presented by the cardholder, i.e., he checks that a card with such an identifier has actually been issued and that he has acknowledged no obligation associated with the card and specified by directions different from the presented ones;

(3) the issuer acknowledges the obligation corresponding to the obligation associated with the card and the cardholder's directions.

The data uniquely determining a particular card are called the identifier of the card. The representation of identifier on the card must withstand the attempts to modify it: at least, it must be unfeasible to modify (counterfeit) the identifier so that the modified identifier would coincide with the identifier of another issued card. In practical implementations the card identifier is often represented as a pair consisting of the card number and password. In general, it is not necessary to represent the identifier in the form of several parts though this might be convenient in concrete implementations.

The directions specifying fulfillment of the obligation consist of arbitrary data with which one must supplement the original obligation associated with the card to give it that concrete and final form in which it will be fulfilled. The form and interpretation of the directions depend on a specific application, and are immaterial for description of the invention. For example, the role of directions may be played by the number of the cardholder's account in which the prize money should be deposited.

The issuer's acknowledgement of an obligation may consist in performing some actions or may serve as an initiator for their execution. For example, on the ground of his acknowledgment, the issuer can enter the identifier of the card and the corresponding directions specifying fulfillment of the obligation in a list of acknowledged obligations or transmit the obligation to a system fulfilling obligations (into the input of a device executing the obligations). The issuer can also issue to the cardholder a signed receipt stating acknowledgment of the obligation.

To prevent a third party from undetectably reading the identifier from the card while the card is on its way from the issuer to the cardholder, the identifier is usually concealed, at least partly, by a masking device (the concealed part of the identifier can be called the password of the card, and the open part of the identifier can be called the number of the card). The masking device is a means to temporarily conceal certain data connected with the card such as the card identifier. The masking device has two states: open and closed, and it must possess the following properties:

(1) It is practically impossible to read or modify the data concealed by the masking device if the masking device is in the closed state.

(2) It is practically impossible to switch the masking device from the open state to the closed one.

(3) It is easy to determine in which state the masking device is: in the open or closed one.

(4) It is easy to switch the masking device from the closed state to the open one (to open the masking device).

(5) It is easy to read the data concealed by the masking device if the masking device is in the open state.

There are many various types of masking devices which are particularly often used for manufacturing tickets of instant lotteries. Only the functional properties of a masking device listed above are of importance for the description of the present invention, while its concrete realization and constructional features are immaterial.

An application of the conventional method described above to selling the access to Internet is described in [1, 2]. In this application, the cardholder uses the conventional method to activate an account with an Internet provider, who is the issuer of the cards.

The US patent [3] discloses an invention related to selling telephone services, which invention includes application of the conventional method described above to selling telephone services. In this invention, the cardholder uses the conventional method to activate or raise the balance of a telephone account with a telephone company, who is the issuer of the cards.

The conventional method for a cardholder to request fulfillment of an obligation associated with the card and for the issuer to acknowledge this obligation has a number of drawbacks.

The main drawback of the conventional method is that it has no intrinsic procedure for resolving disputes and hence it is not protected against cheaters. For example, an unscrupulous cardholder may choose new directions and request the issuer to fulfill the obligation associated with the card already used earlier. In this case the issuer is unable to prove to the third party that the card is reused. On the other hand, an unscrupulous issuer may refuse to acknowledge and fulfill his obligation, claiming that he has already fulfilled the obligation associated with the given card and specified by some other directions. In this case the cardholder will be unable to prove to the third party that the card was not used earlier by anybody. This drawback is due to the fact that after the completion of the session of the method neither the cardholder, nor the issuer retains any data which they could not have formed without assistance of the opposite party and which could serve as a proof in the dispute resolution. Furthermore, if the issuer has refused to acknowledge his obligation associated with the card, then after the completion of the session of the method the cardholder remains with the card in the same state in which it would be if the issuer acknowledged his obligation, i.e., the card with an open masking device of the identifier if it is used to temporarily conceal the identifier of the card.

The consequence of this drawback is that a malfunction of equipment and communication channels, as well as just human errors, may lead to the situation when the conscientious participant of the conventional method will appear to be unscrupulous from the point of view of the opposite party.

Another drawback of the conventional method stems from the fact that the knowledge of the card identifier is sufficient to request fulfillment of the obligation associated with the card, and that there always is a time interval during which the identifier is not protected. A swift malefactor who learned the card identifier, may manage to request fulfillment of the obligation associated with the card before the legitimate cardholder. For example, the malefactor can peep at the identifier "over the shoulder" or intercept it when the identifier is on its way to the issuer (if the channel of communication is not protected).

DISCLOSURE OF INVENTION

The main object of the present invention is to provide a secure method for a cardholder to request fulfillment of an obligation associated with the card and for the issuer to acknowledge this obligation, which method allows a remote interaction of the parties. The security of the method is ensured, in particular, by the presence of a dispute resolution procedure. The dispute resolution procedure is conclusive for a third party and completely protects the party acting strictly within the framework of the method.

Another object of the present invention is to weaken negative consequences of malfunctions in the equipment and communication channels, as well as of human errors.

Yet another object of the present invention is to prevent an unauthorized use of a card in those cases when the identifier of the card turns out to be intercepted by cheaters.

The essence of the method according to the present invention is as follows.

The issuer issues cards, each of which has an identifier and the corresponding verifier, the latter being concealed, at least partially, by a masking device. Additional data corresponding to the identifier of the card are called the verifier of the card. The rule of the correspondence between the verifier and identifier of the card must be such that for a party other than the issuer, it would be practically impossible to derive the corresponding verifier from the identifier provided that party did not know in advance which verifier corresponds to the given identifier. In particular, for a party other than the issuer, it must be practically impossible to determine the card verifier without opening the masking device concealing the verifier.

With each card one associates an obligation of the issuer, for example, by way of informing potential cardholders, by putting suitable inscriptions on the card, and by other generally accepted methods. After that, the cards are distributed among the cardholders. On receipt of the card, the cardholder must check that the masking device concealing the verifier of the card is in the closed state.

A cardholder requests the issuer to fulfill the obligation associated with the card, and the issuer acknowledges the obligation by performing the following steps:

(1) the cardholder reads the identifier from the card and presents to the issuer a request for fulfillment of the obligation associated with the card, which request includes the identifier of the card and directions specifying fulfillment of the issuer's obligation;

(2) the issuer checks that he has not earlier presented to anybody a signed reply binding the identifier presented by the cardholder and directions different from the directions presented by the cardholder, forms a reply to the cardholder, which reply binds the identifier and directions presented, signs the formed reply and presents the signed reply to the cardholder;

(3) the cardholder verifies the issuer's signature on the reply and checks that the signed reply binds the identifier and directions which the cardholder presented to the issuer, after which the cardholder reads the verifier from the card and presents the verifier to the issuer;

(4) the issuer checks that the verifier presented by the cardholder corresponds to the identifier presented by the cardholder;

(5) the issuer acknowledges the obligation corresponding to the obligation associated with the card and the cardholder's directions.

To avoid mutual influence between different sessions of the described procedure, the issuer must not proceed to step 2 as long as step 2 is being executed in another session of the procedure described.

Steps 2–4 in the present method correspond to step 2 in the conventional method (verifying the validity of the card using the identifier and directions presented by the cardholder) and replace it.

The issuer's reply must bind the presented identifier and directions in such a way that it is practically impossible to find an identifier corresponding to an issued card and some directions which, in the aggregate, are different from the identifier and the directions presented, but are also bound by this reply (under the condition that the identifier presented also corresponds to an issued card). For example, the reply may coincide with the cardholder's request. In another variant, the reply can be a concatenation of the directions and that part of the identifier which uniquely determines a particular card. In one more variant, the reply can be the value of a certain cryptographic hash function calculated for the concatenation of the identifier and directions [4, 5, 7].

There are many ways for the issuer to check that he has not earlier presented to anybody a signed reply binding the identifier presented by the cardholder and directions different from the directions presented by the cardholder. For example, the issuer can maintain a list of replies that were signed and presented to somebody and search the list to carry out this check.

If for some reasons the issuer cannot execute his next step of the described procedure or if the next check yields a negative result, then the issuer stops following the described procedure and may notify the cardholder of this.

If for some reasons the cardholder cannot or does not want to execute his next step of the described procedure or if the next check yields a negative result, then the cardholder may initiate the dispute resolution procedure.

The dispute resolution procedure is as follows. If the cardholder acts according to the method described in the present invention, then either he has a card with the closed masking device of the verifier or he has a card and the issuer's signature on his reply binding the identifier of the card and the directions specifying fulfillment of the obligation. Hence, initiating a dispute, the cardholder must produce either a card with closed masking device of the verifier or a card and the issuer's signature on his reply binding the identifier of that card and directions specifying fulfillment of the obligation. In the first case the issuer takes the card from the cardholder and acknowledges the obligation associated with the card and specified by the directions presented by the cardholder in the dispute resolution procedure. In the second case the issuer makes sure that the masking device of the verifier is open, and if it is closed, then the cardholder must open it. After that, the issuer acknowledges the obligation associated with the card and specified by the directions, which directions were bound to the identifier of the presented card by the signed reply of the issuer.

In the second variant of a dispute, where a cardholder produces the card and the issuer's signature on his reply binding the identifier of the card and directions specifying fulfillment of the obligation, another dispute resolution procedure is also possible. This dispute resolution procedure runs as follows. The issuer checks that he has not acknowledged the obligation associated with the card and specified by the directions which are bound to the identifier of the card by the issuer's signed reply. After that, the issuer takes the card from the cardholder and acknowledges the obligation associated with the card and specified by the directions presented by the cardholder in the dispute resolution procedure.

In practical implementations of the method, other modifications of the dispute resolution procedure are possible, as well.

The directions specifying fulfillment of the obligation that were presented by the cardholder in the dispute resolution procedure may differ from the directions presented in the procedure of requesting fulfillment of an obligation, which procedure failed and led to the dispute. Moreover, the set of the directions specifying fulfillment of the obligation that are admissible in the dispute resolution procedure may differ from the set of directions admissible in the procedure of requesting fulfillment of an obligation. This set can also depend on the stage of the dispute. For example, the directions presented by the cardholder in the dispute resolution procedure may include the request to return the money that were paid for the card or the request to pay out a forfeit.

The security of the described method is also ensured, in particular, by the fact that even if a malefactor gets to know the identifier of the card and has time to request the issuer to fulfill the obligation associated with the card before the cardholder, neither the cardholder nor the issuer will suffer direct losses, while the malefactor will get no direct profit. Indeed, the malefactor does not know the verifier of the card, and so he will not be able to complete the procedure of requesting fulfillment of an obligation. On the other hand, if the directions of the malefactor and cardholder are different, then, when the cardholder presents to the issuer his request to fulfil the obligation associated with the card, the issuer will discover that he has already issued a signed reply binding the identifier of the card and directions different from the directions presented, and he will interrupt the procedure of requesting fulfillment and acknowledging an obligation. Such a situation can be settled in the dispute resolution procedure. This also means that it is desirable to protect the identifier of the card.

In order to preclude the possibility of guessing the identifier of the card, the set of identifiers of the issued cards must constitute a negligible fraction of all possible identifiers. In this case, a malefactor is unable to indicate the identifier of at least one of the issued cards otherwise than by reading the identifier from the card.

In order to preclude a malefactor from undetectably reading the identifier from a card before the card has reached the cardholder, the identifier of the card may be concealed, at least partly, by a masking device. In this case, on receipt of the card, the cardholder must also check that the masking device concealing the identifier of the card is in the closed state.

If a masking device is used for concealing the identifier, then the cardholder can mistakenly open the masking device of the verifier before the masking device of the identifier. Such a mistake does not deprive the cardholder of the possibility to request fulfillment of the obligation associated with the card though it deprives him of the protection against a malevolent issuer, or, under certain circumstances, against malfunction of the equipment. In order to preclude such mistakes, the construction of the card and of the masking devices may be such that opening the masking device of the verifier is practically impossible without first opening the masking device of the identifier. For example, a card may consist of a sealed envelope containing the second part of the card, which part has an identifier and a verifier, the verifier being concealed by a masking device. In this case, the envelope serves as the masking device of the identifier, and it is practically impossible to open the masking device of the verifier without opening the masking device of the identifier, i.e., without opening the envelope.

The construction of the cards and of the masking devices can be such that the verifier of the card possesses the properties of an identifier and the identifier possesses the properties of a verifier with respect to the verifier of the card which is used as an identifier. In this case, the cardholder can choose on his own which concealed data of the card he will use as an identifier and which as a verifier. The issuer must be able to determine which data of the card are used by the cardholder as an identifier and which as a verifier from the cardholder's request for fulfillment of an obligation. For example, the formats of the respective data may be different, and the issuer determines which data of the card are used by the cardholder as an identifier and which as a verifier from the format of the data presented. For such cards the cardholder's mistake of opening the masking device of the verifier before the masking device of the identifier is innocuous, since the verifier and the identifier play symmetric roles. Such cards can also be used in game applications and promotional advertising campaigns, when the prize depends on the cardholder's choice of the order in which the masking devices are opened.

A card may consist of several physically disconnected parts, which, nevertheless, are united logically. For example, each part may have certain auxiliary data, which uniquely determine the parts that combined together constitute one card. Such cards can be used in game applications and in promotional advertising campaigns, where the cardholder must preliminarily collect together the separate parts of a card.

If the rule of the correspondence between the verifier and identifier of the card is such that the cardholder can independently generate pairs consisting of an identifier and the corresponding verifier, then before acknowledging his obligation the issuer must additionally check that the presented identifier coincides with the identifier of an issued card. The issuer can also perform this check to have a possibility to notify the cardholder of his mistakenly reading the identifier of the card, as well as to quicken the discovery of such a mistake. The issuer must have a means for determining whether the presented identifier coincides with the identifier of an issued card. This means should preferably be a secret of the issuer. For example, as such a means the issuer may use the list of identifiers of all the cards issued.

To raise the level of confidentiality, as well as to prevent interception of the identifier by malefactors in the process of delivering the request for fulfillment of the obligation associated with the card to the issuer, the parties may encrypt their messages. A particular choice of encryption methods is immaterial for the present invention. For example, the cardholder may encrypt the data presented to the issuer using the issuer's public key within the framework of some predetermined asymmetric encryption system [4, 5]. The issuer may encrypt the data presented to the cardholder, for example, using keys additionally included by the cardholder in his messages for the issuer.

Directions specifying fulfillment of the obligation associated with a card may include identification data of the entity controlling fulfillment of the obligations acknowledged by the issuer. In particular, one may use as such data a public key of the entity in a predetermined digital signature system. By issuing orders bearing digital signatures verifiable with the public key of the entity, the entity can, for example, control the process of the issuer's fulfilling the acknowledged obligation.

To facilitate the issuer's checking whether the verifier of the card presented by the cardholder corresponds to the identifier presented by the cardholder, the cardholder may repeatedly present to the issuer the identifier or a suitable part of the identifier together with the verifier.

In order to have a possibility to notify the cardholder of his mistakenly forming directions specifying fulfillment of the obligation associated with a card, as well as to quicken the discovery of such a mistake, the issuer may additionally check whether the presented directions meets the criteria of correctness of directions established and published beforehand.

The validity of the signature on the issuer's reply may be restricted by certain conditions. For example, the conditions of the validity of the signature on the reply may be determined by the signature system used or by the issuer himself. In particular, such a condition may be a time period on the expiration of which the signature becomes invalid. The issuer's signed reply may also contain conditions of the validity of the signature. If there are conditions restricting the validity of the signature, the issuer can present to the cardholder a new signed reply binding certain directions to an identifier received earlier provided the issuer has not already acknowledged the obligation (the cardholder has not presented the verifier of the card), and the signature on the reply presented earlier has become invalid. If, before opening the masking device of the verifier, a cardholder discovers that the conditions of validity of the signature are not fulfilled, then he has a possibility to receive the issuer's new signed reply, and, in particular, to replace the previous directions by new ones.

If a malefactor learns the identifier of a card before the cardholder uses the card, then the malefactor can request the issuer to fulfill the obligation associated with the card ahead of the cardholder. Such actions of the malefactor will bring him no direct profit and will inflict no direct losses neither on the issuer or on the legitimate cardholder. However this will lead to interruption of the procedure of requesting fulfillment of an obligation, and the parties will be forced to proceed to the dispute resolution procedure. For this reason, the cardholder should preferably keep the identifier of his card secret until he obtains a positive result of verifying the issuer's signature on the reply binding the identifier of the card and the directions specifying fulfillment of the obligation, which identifier and directions he presented to the issuer in his request.

To lessen the number of disputes caused by malfunction of communication channels, the cardholder may repeatedly send the issuer the request to fulfill the obligation associated with the card if he has received no reply to his previous request. If the issuer discovers that the presented request contains an identifier for which a signed reply has been issued earlier, then he must compare the received directions specifying fulfillment of the obligation with the directions already bound to the given identifier by the reply signed and sent out earlier. If these directions coincide, then the previous signed reply may be repeatedly presented to the cardholder.

Having checked whether the verifier presented by the cardholder corresponds to the identifier presented by the cardholder, the issuer can notify the cardholder of an error or of the acknowledgment of his obligation. To lessen the number of disputes caused by malfunction of communication channels, the cardholder can repeatedly send the verifier of his card to the issuer if he has been notified neither of an error nor of the issuer's acknowledgment of the obligation.

The issuer may sign his messages in order to prevent a malefactor from presenting to the cardholder a false error notification or some other bogus message on behalf of the issuer, thus confusing the cardholder and forcing him to initiate a dispute.

The reply signed by the issuer may contain additional data, for example, those connected with the procedure of fulfilling the obligation. In particular, the reply may include access passwords, the validity period of the signature on the reply on the expiration of which the signature becomes invalid, etc.

BRIEF DESCRIPTION OF DRAWINGS

FIG. 4 represents a lottery ticket with open masking devices of the identifier (password) and verifier;

FIG. 5 represents a lottery ticket with closed masking devices of the identifier (password) and verifier;

FIG. 6 represents a lottery ticket with open masking device of the identifier (password) and with closed masking device of the verifier.

BEST MODE FOR CARRYING OUT THE INVENTION

Figure 1:
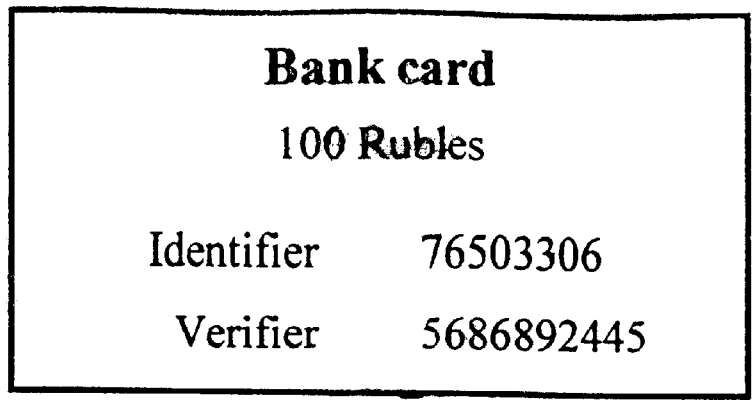
FIG. 1 represents a bank card with open masking devices of the identifier and verifier.

The issuer issues cards each of which has an identifier and a verifier V corresponding to the identifier. The identifier of a card consists of the card number N and password P. The password of the card is concealed by the masking device of the identifier, and the verifier of the card is concealed by the masking device of the verifier. When the cards are manufactured, their numbers are chosen consecutively in a certain range and the password and the verifier of a card are determined by the card number N according to the following rule: $P=H_1(N, R)$, $V=H_2(N, R)$, where $H_1$ and $H_2$ are some cryptographic hash functions with a secret key R [4, 5]. The hash functions $H_1$ and $H_2$ are chosen in such a way that without knowledge of R it is practically impossible to determine the verifier corresponding to a given identifier, i.e., to a given number and password, if only it was not known beforehand which verifier corresponds to the given identifier. The issuer selects the key R with the help of a random number generator and keeps it secret.

Such a construction of the card identifiers and verifiers insures that for a party other than the issuer it is practically impossible to determine the verifier of a card from the identifier of the card without opening the masking device of the verifier. On the other hand, the issuer can easily determine whether the presented identifier corresponds to an issued card. To do this, he needs only to check that the number lies in the proper range and to compare the presented password with the value which is computed from the identifier (the number) and the secret key R. The issuer can also easily determine whether the presented verifier corresponds to the presented identifier, since the verifier is computed from the identifier (the number) and the secret key R.

The actions of the issuer and of the cardholders within the framework of the present invention do not depend on a particular type of the signature system used by the issuer for signing his replies (messages). However the preferable variant of the signature system is some variant of the digital signature system [4–6], since in this case the signature on the data can be transmitted via electronic communication channels.

Within the framework of a digital signature system, such as, for example, RSA [4, 5], the issuer chooses the first private key, which he will use to produce digital signatures on various data, and the first public key corresponding to the first private key, which will be used by interested parties to verify the issuer's signatures. Within the framework of an asymmetric encryption system, such as, for example, RSA [4, 5], the issuer also chooses the second private key, which he will use to decrypt received messages, and the second public key corresponding to the second private key, which will be used by interested parties to encrypt messages for the issuer. The first and second public keys, as well as the choice of the digital signature system and of asymmetric encryption system, are published (are brought to the notice of the interested parties). The issuer also makes public his intention to encrypt his messages to the cardholders using session keys and some algorithm of symmetric encryption, for example, IDEA [5, p. 263].

The cardholder can form directions specifying fulfillment of an obligation, and also perform cryptographic operations (generation of session keys, encryption, decryption, digital signature verification, etc.) with the help of some device, for example, a telephone set or a properly programmed computer.

With each card one associates an obligation of the issuer, for example, by way of informing potential cardholders, by putting suitable inscriptions on the card, and by other generally accepted methods. After that, the cards are distributed among the cardholders. On receipt of the card, the cardholder must check that the masking devices concealing the password and the verifier of the card are in the closed state.

A cardholder requests the issuer to fulfill the obligation associated with the card, and the issuer acknowledges the obligation by performing the following steps:

(1) the cardholder reads the identifier from the card and sends the issuer a request for fulfillment of the obligation associated with the card, which request is encrypted using the issuer's second public key and includes the identifier of the card, directions specifying fulfillment of the issuer's obligation, and the first session key;

(2) the issuer decrypts the received request using the second private key, checks that the presented identifier coincides with the identifier of an issued card, checks that he has not earlier presented to anybody a signed reply binding the identifier presented by the cardholder and directions different from the directions presented by the cardholder, forms a reply to the cardholder, which reply binds the number of the card and the directions presented, signs the formed reply using the first private key, encrypts the signed reply using the first session key received, and sends the signed and encrypted reply to the cardholder;

(3) the cardholder decrypts the received reply using the first session key, verifies the issuer's signature on the reply using the issuer's first public key, and checks that the signed reply binds the number of the card and the directions which he has sent to the issuer, after which the cardholder reads the verifier from the card and sends the verifier and the number of the card to the issuer;

(4) the issuer checks that the verifier received from the cardholder corresponds to the identifier received from the cardholder;

(5) the issuer acknowledges the obligation corresponding to the obligation associated with the card and the cardholder's directions.

To avoid mutual influence between different sessions of the described procedure, the issuer must not proceed to checking that he has not earlier presented to anybody a signed reply binding the identifier presented by the cardholder and directions different from the directions presented by the cardholder, as long as the same checking and forming and signing the reply to the cardholder are performed in another session of the described procedure.

If for some reasons the issuer cannot execute his next step of the described procedure or if the next check yields a negative result, then the issuer stops following the described procedure and notifies the cardholder of this.

Industrial Applicability

Example 1

This example illustrates realization of the method for a cardholder to request fulfillment of an obligation associated with the card and for the issuer to acknowledge this obligation, where the issuer is a bank and the cardholder is a client of the bank. Associated with each card is an obligation of the bank to deposit 100 rubles in the account indicated by the client in possession of the card.

Before issuing cards, the bank compiles a checking table having four columns, with number of rows equal to the number of the cards issued. Though in practice the bank can issue an arbitrarily large number of cards, considered is the case where 5 cards are issued. In the cells of the column "Identifier" of the checking table, one enters pairwise-distinct random sequences of eight digits obtained with the help of a random number generator. In the cells of the column "Verifier", one enters random sequences of ten digits also obtained with the help of a random number generator. Let after filling in the cells of these columns the checking table takes the form shown in Table I.

Figure 2:
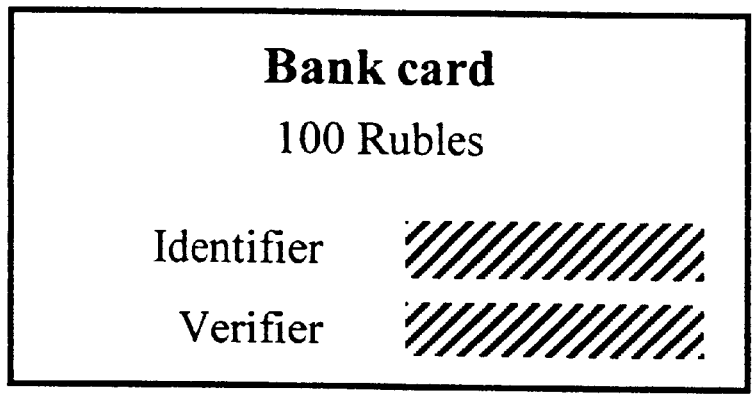
FIG. 2 represents a bank card with closed masking devices of the identifier and verifier.

Further, the bank manufactures five cards each of which has two fields "Identifier" and "Verifier", and as the values of these fields for every next card one uses the corresponding values in the next row of Table I. FIG. 1 shows the card corresponding to the third row of this table. The fields of the manufactured cards are covered with a layer of an opaque paint, which is easy to remove but difficult to restore and which plays the role of a masking device, after which the cards acquire the appearance shown in FIG. 2.

Table I determines the correspondence between the verifier of a card and its identifier according to the following rule: the verifier corresponds to the identifier if the verifier and the identifier of the card are in the same row of Table I. According to the method of manufacturing the cards the verifier of each card corresponds to its identifier. The bank must keep Table I secret. For the party not possessing Table I, it is practically impossible to determine the verifier of a card from its identifier without opening the masking device of the verifier because the identifiers and verifiers have been chosen at random.

Within the framework of the digital signature system RSA [4, 5], the bank chooses a private key D, which the bank will use to produce digital signatures on various data, and a public key E corresponding to D, which will be used by interested parties to verify the bank's signatures. The public key E, as well as the made choice of the digital signature system, is made public (is brought to the notice of the interested parties).

In order that the parties could uniformly and unambiguously interpret the contents of messages, as well as to facilitate automating the message processing, the bank makes public the formats of all messages which the parties will use in requesting fulfillment and acknowledging obligations. The messages may have the following formats.

The format of a request to fulfill the obligation associated with a card: "ID=*, ACCOUNT=*".

The format of the bank's reply: "ID=*, ACCOUNT=*".

The format of presenting the verifier: "VERIFIER=*".

In these formats, ID denotes the identifier of a card, ACCOUNT denotes the account in which one should deposit 100 rubles, and VERIFIER denotes the verifier of a card. When sending messages, one must replace the asterisks by the real values of the respective quantities.

The bank's obligation to deposit 100 rubles in the account indicated by the cardholder is associated with each card by way of informing the potential clients and by way of putting a suitable inscription on each card. After that, the cards are distributed among the clients.

Figure 3:
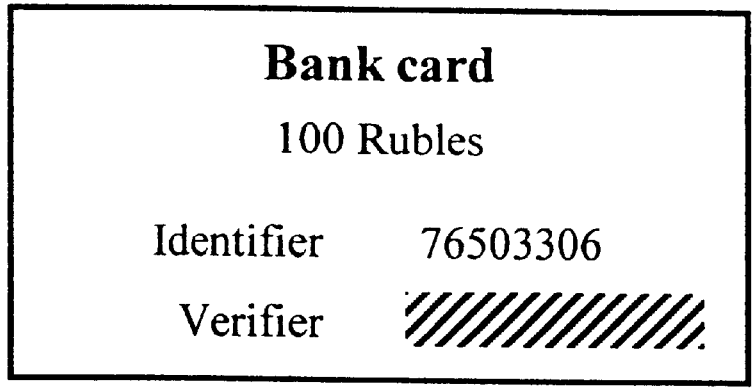
FIG. 3 represents a bank card with open masking device of the identifier and with closed masking device of the verifier.

Let a bank client purchase a card corresponding to the third row of Table I. Further, assume that the client wishes to request the bank to fulfill the obligation associated with the card and he decides to indicate his account 1001 with the bank as the account in which 100 rubles should be deposited. At first, the client opens the masking device of the identifier, i.e., removes the layer of paint from the field "Identifier" of his card, leaving the field "Verifier" intact, after which the card acquires the appearance shown in FIG. 3 and the identifier 76503306 becomes accessible for reading. Further, the client inputs the identifier of the card and the number of the bank account in which 100 rubles should be deposited into a properly programmed computer. After that, the computer forms the request "ID=76503306, ACCOUNT=1001", where the part ACCOUNT=1001 is the directions specifying fulfillment of the obligation, and sends the request to the bank via an open communication network.

Having received a request, the bank proceeds to verifying the validity of the card using the identifier and the directions presented. At first, the bank searches the column "Identifier" of Table I for the identifier 76503306 contained in the request and finds it in the third row. Then the bank checks that the cell "Account" in the third row does not contain a value different from 1001, which means that the bank has not earlier presented to anybody a signed reply binding the identifier 76503306 and directions different from 1001. After that, the bank enters the received account number 1001 in the cell "Account". The checking table takes the form shown in Table II.

Further, the bank forms the reply "ID=76503306, ACCOUNT=1001", signs it with the bank's private key D and sends the signed reply to the client via an open communication network.

Having received the signed reply, the client verifies the bank's signature on the reply using the bank's public key E and checks that the reply has the form "ID=76503306, ACCOUNT=1001". Further, the client opens the masking device of the verifier, i.e., removes the layer of paint from the field "Verifier" of his card, after which the card acquires the appearance shown in FIG. 1, and the verifier of the card 5686892445 becomes accessible for reading. After that, the client, using the computer, forms the verification message "VERIFIER=5686892445" and sends the verification message to the bank via an open communication network.

Having received the verification message, the bank searches the column "Verifier" of Table II for the verifier 5686892445 contained in the message and finds it in the third row. After that, the bank checks that the cell "Account" in the third row is not empty, i.e., that the bank has earlier received a request and the verifier 5686892445 corresponds to the identifier of that request. In our example, the correspondence is present, and therefore the bank acknowledges its obligation associated with the card with identifier 76503306, which obligation is specified by the respective directions. As a sign of acknowledgment the bank fills in the cell "Acknowledgment" in the third row as is indicated in Table III.

On the basis of the acknowledgment, the bank fulfills the obligation corresponding to the obligation associated with the card and the cardholder's directions, i.e., deposits 100 rubles in account 1001.

Example 2

This example illustrates realization of the method for a cardholder to request fulfillment of an obligation associated with the card and for the issuer to acknowledge this obligation, where the issuer is a lottery, the cardholder is a player, and the lottery tickets play the role of cards. Associated with each ticket is an obligation of the lottery to deliver the prize to the address indicated by the player who purchased the ticket.

Before issuing lottery tickets, the lottery selects a random sequence R consisting of thirty two hexadecimal digits. The lottery generates this R with the help of a random number generator. The hexadecimal digits are 0, 1, 2, 3, 4, 5, 6, 7, 8, 9, A, B, C, D, E, F. Let lottery obtains the following sequence:

R=16397D2AB474D3EC56AE22EB93ED3C17.

The lottery must keep the sequence R secret.

Further, the lottery manufactures 100000 lottery tickets each having three fields: "Number", "Password", and "Verifier". The values of the fields "Number" and "Password" together constitute the identifier of a ticket. As the value of the field "Number" of a ticket, one uses the next serial number in the range from 00000 to 99999 (the leading zeros are a part of the number). Thus, the number consists of five decimal digits. As the value of the field "Password" of the ticket with number N, one uses the first ten hexadecimal digits of the value H(N∥R), where H is the hash function SHA-1 [5, p. 348], and the symbol ∥ denotes the concatenation of bit strings. As the value of the field "Verifier" of the ticket with number N, one uses the last ten hexadecimal digits of the value H(N∥R). Thus, the identifier consisting of the number N and password P is the identifier of an issued ticket if N contains five decimal digits (including the leading zeros), and P coincides with the first ten hexadecimal digits of the value H(N$\mu$R). The verifier V corresponds to the identifier consisting of the number N and password P if V coincides with the last ten hexadecimal digits of the value H(N$\mu$R). According to the method of manufacturing the lottery tickets, the verifier of each ticket corresponds to its identifier. For the party not possessing the sequence R of hexadecimal digits, it is practically impossible to determine the verifier of the ticket from the identifier of a ticket without opening the masking device of the verifier, which impossibility is ensured by the properties of the hash function SHA-1 [4, 5].

FIG. 4 shows the ticket with number 18765. Since H(1876516397D2AB474D3EC56AE22EB93ED3C17)= 27035D4B8C0CE7DD2A8D1EB9AB2BC1554B07E2FE, it follows that the ticket password has value 27035D4B8C and the verifier has the value 554B07E2FE.

The fields "Password" and "Verifier" of the manufactured tickets are covered with a layer of an opaque paint, which is easy to remove but difficult to restore and which plays the role of a masking device, after which the tickets acquire the appearance shown in FIG. 5. Thus, the identifier of a lottery ticket is concealed by the masking device only partly.

Within the framework of the digital signature system RSA [4, 5], the lottery chooses a private key D1, which it will use to produce the digital signatures on various data, and the corresponding public key E1, which will be used by interested parties to verify the lottery's signatures. Within the framework of the asymmetric encryption system RSA[4, 5], the lottery also chooses a private key D2, which it will use to decrypt received messages, and the corresponding public key E2, which will be used by interested parties to encrypt their messages for the lottery. The public keys E1 and E2, as well as the made choice of the digital signature system and the asymmetric encryption system, are published (are brought to the notice of the interested parties). The lottery also makes public its intention to encrypt its messages for the lottery players, using session keys and IDEA algorithm of symmetric encryption [5, p. 263].

Besides, in order that the parties could uniformly and unambiguously interpret the contents of messages, as well as to facilitate automating the message processing, the lottery makes public the formats of all messages which the parties will use in requesting fulfillment and acknowledging obligations. The messages have the following formats.

The format of a request to fulfill the obligation associated with a ticket: "N=*, P=*, K=*, A=*".

The format of the lottery's reply: "N=*, A=".

The format of presenting the verifier: "N=*, K1=*, V=*".

The format of notifying of an error/success: "N=*, E=*".

In these formats, N denotes the number of the ticket, P denotes the password of the ticket, K denotes the session key which the lottery must use to encrypt its reply to the request (32 hexadecimal digits), A denotes the address to which the prize should be delivered, K1 denotes the session key which the lottery must use to encrypt the reply to the verification message (32 hexadecimal digits), V is the verifier of the ticket, and E is the error/success code. The code E=0 is sent back to the player in reply to the verification message if the verification of the ticket has been successful and the lottery acknowledges its obligation. The codes E>0 correspond to various errors. The list of error codes is also made public. When sending messages, one must replace the asterisks by the real values of the respective quantities.

The lottery's obligation to deliver the prize to the address indicated by the lottery player who purchased the ticket is associated with each ticket by way of informing the potential lottery players and by way of putting a suitable inscription on each ticket. Other conditions of the lottery are also made public. After that, the tickets are distributed among the players. Only the numbers of the tickets take part in the drawing.

In the course of drawing, the lottery compiles a prize-list having four columns, with number of rows equal to the number of the tickets having won a prize. The prize-list may have the form shown in Table IV. The numbers of the winning tickets are entered in the cells of the column "Number", and the corresponding codes of the prizes are entered in the cells of the column "Prize".

Let the lottery player who purchased the winning ticket with number 18765 wish to request the lottery to fulfill the obligation associated with the ticket. At first, the player opens the masking device of the identifier, i.e., removes the layer of paint from the field "Password" of his ticket, leaving the field "Verifier" intact, after which the ticket acquires the appearance shown in FIG. 6, and the password 27035D4B8C becomes accessible for reading. Further, the player inputs the number and password of the ticket and the address to which the prize should be delivered into a properly programmed computer. After that, the computer generates the session key K and forms the request "N18765, P=27035D4B8C, K=B360AB551A4A874C79F17EAC4B043125, A=Apt. 322, 39 Radishcheva St., St.-Petersburg", where the part "A=Apt. 322, 39 Radishcheva St., St.-Petersburg" is the directions specifying fulfillment of the obligation. Further, the computer encrypts the request with the lottery's public key E2 and sends the encrypted request to the lottery via an open communication network.

Having received the encrypted request, the lottery decrypts it using the private key D2 and proceeds to verifying the validity of the ticket using the identifier and the directions presented. At first, the lottery checks that the presented identifier consisting of the number N=18765 and the password P=27035D4B8C coincides with the identifier of an issued ticket, i.e., N contains five decimal digits and P coincides with the first ten hexadecimal digits of the value H(N||R). In our example this is so. After that, the lottery searches Table IV for a row whose cell "Number" contains the received number 18765, i.e., it checks that the ticket with number 18765 has actually won a prize. In our example, this ticket has won a prize with code 7. Further, the lottery checks that the cell "Delivery address" in the row found does not contain a value different from "Apt. 322, 39 Radishcheva St., St.-Petersburg". This means that the lottery has not earlier presented to anybody a signed reply binding the identifier 1876527035D4B8C and directions different from "Apt. 322, 39 Radishcheva St., St.-Petersburg". After that, the lottery enters the received address in the cell "Delivery address" of the row found. The prize-list takes the form shown in Table V.

Further, the lottery forms the reply "N=18765, A=Apt. 322, 39 Radishcheva St., St.-Petersburg", signs it using the private key D1, encrypts the signed reply using the received session key K, and sends the signed and encrypted reply to the player via an open communication network. The formed reply binds the directions to the identifier of the ticket, since the ticket number N uniquely determines the particular ticket and its identifier.

Having received a signed and encrypted reply, the player decrypts it with using session key K known to him, verifies the lottery's signature on the reply using the lottery's public key E1, and checks that the reply has the form "N=18765, A=Apt. 322, 39 Radishcheva St., St.-Petersburg". Further, the player opens the masking device of the verifier, i.e., removes the layer of paint from the field "Verifier" of his ticket, after which the ticket acquires the appearance shown in FIG. 4, and the verifier 554B07E2FE of the ticket becomes accessible for reading. After that, the player, with the help of a computer, generates the session key K1, forms the verification message "N=18765, K1=C3BBCFF3332169AC08DC45178A0B6514, V=554B07E2FE", encrypts it using the lottery's public key E2, and sends the encrypted verification message to the lottery via an open communication network.

Having received the encrypted verification message, the lottery decrypts it using the private key D2 and searches the prize-list (Table V) for the row whose cell "Number" contains the number 18765 received in the verification message. In our example, there is such a row. The lottery checks that the cell "Delivery address" of the row found is not empty, i.e., the lottery has earlier received a request. After that, the lottery checks that the received verifier V=554B07E2FE corresponds to the identifier with number N=18765, i.e., it checks that V coincides with the last ten hexadecimal digits of the value H(N||R). In our example, the correspondence is present, and therefore the lottery acknowledges its obligation associated with ticket 18765, which obligation is specified by the respective directions. As a sign of acknowledgment the lottery fills in the cell "Acknowledgment" of the row found, for example, as is indicated in Table VI.

The lottery forms the notification "N=18765, E=0" of a successful completion of the ticket verification and of the lottery's acknowledgment of its obligation, signs it using the private key D1, encrypts the signed notification using the received session key K1, and sends the signed and encrypted notification to the player via an open communication network.

On the basis of the acknowledgment, the lottery fulfills the obligation corresponding to the obligation associated with the lottery ticket and to the player's directions, i.e., the lottery delivers the prize with code 7 to the address: Apt. 322, 39 Radishcheva St., St.-Petersburg.

Thus, the interests of the parties are surely protected at every stage of executing the procedure of a cardholder's requesting fulfillment of an obligation associated with a card and the issuer's acknowledging this obligation: either by the card (by the state of the masking device of the verifier) or by the issuer's signature on the reply binding the identifier of the card and the directions presented by the cardholder to the issuer.

REFERENCES

[1] Internet for plastic cards: a service transformed into a commodity, READ.ME, St.-Petersburg, 1997, no. 2 (40), p. 10.

[2] Tsikhilov Aleksandr Magomedovich, A utility model "Identification card for access to Internet", Certificate no. 6460, priority date Apr. 27, 1997, registered in the register of utility models on Apr. 16, 1998.

[3] James N. Hamrick, Jr., Secured disposable debit card calling system and method, U.S. Pat. No. 5,504,808, Apr. 2, 1996.

[4] B. Schneier, Applied Cryptography: protocols, algorithms, and source code in C, John Wiley&Sons, New York, 2nd edition, 1996, pp. 784.

[5] Alfred J. Menezes, Paul C. van Oorschot and Scott A. Vanstone, Handbook of applied cryptography, CRC Press, New York, 1996, pp. 816.

[6] GOST R 34.10-94 Information technology. Cryptographic protection of information. Procedures of producing and verifying the electronic digital signature based on an asymmetric cryptographic algorithm. Publishing house of standards (Izdatel'stvo standartov), Moscow, 1994.

[7] GOST R 34.11-94 Information technology. Cryptographic protection of information. Hash function. Publishing house of standards (Izdatel'stvo standartov), Moscow, 1994.

TABLE I

| Identifier | Verifier | Account | Acknowledgment |
|---|---|---|---|
| 78564636 | 2903857097 | | |
| 67450404 | 6503602560 | | |
| 76503306 | 5686892445 | | |
| 90476597 | 3987658782 | | |
| 75849008 | 6859522356 | | |

TABLE II

| Identifier | Verifier | Account | Acknowledgment |
|---|---|---|---|
| 78564636 | 2903857097 | | |
| 67480404 | 6503602560 | | |
| 76503306 | 5686892445 | 1001 | |
| 90476597 | 3987658782 | | |
| 75849008 | 6859522356 | | |

TABLE III

| Identifier | Verifier | Account | Acknowledgment |
|---|---|---|---|
| 78564636 | 2903857097 | | |
| 67480404 | 6503602560 | | |
| 76503306 | 5686892445 | 1001 | Acknowledged |
| 90476597 | 3987658782 | | |
| 75849008 | 6859522356 | | |

TABLE IV

| Number | Prize | Delivery address | Acknowledgment |
|---|---|---|---|
| 00501 | 3 | | |
| .... | ... | | |
| 18765 | 7 | | |
| .... | ... | | |
| 90032 | 5 | | |

TABLE V

| Number | Prize | Delivery address | Acknowledgment |
|---|---|---|---|
| 00501 | 3 | | |
| ... | ... | | |
| 18765 | 7 | Apt. 322, 39 Radishcheva St., St.-Petersburg | |
| ... | ... | | |
| 90032 | 5 | | |

TABLE VI

| Number | Prize | Delivery address | Acknowledgment |
|---|---|---|---|
| 00501 | 3 | | |
| ... | ... | | |
| 18765 | 7 | Apt. 322, 39 Radishcheva St., St.-Petersburg | Acknowledged |
| ... | ... | | |
| 90032 | 5 | | |

What is claimed is:

1. A method for a cardholder to request fulfillment of an obligation associated with a card and for an issuer to acknowledge this obligation, comprising issue of cards each having an identifier and with each an obligation of the issuer being associated, reading the identifier from the card by the cardholder, the cardholder's presenting to the issuer the identifier read from the card and directions specifying fulfillment of the obligation associated with the card, the issuer's verifying the validity of the card using the identifier and directions presented by the cardholder, and the issuer's acknowledgment of the obligation corresponding to the obligation associated with the card and the cardholder's directions, characterized in that one issues cards each additionally having the verifier corresponding to the identifier and concealed, at least partly, by a masking device, the issuer, when verifying the validity of the card using the identifier and directions presented by the cardholder, checks that the issuer has not presented previously a signed reply binding the identifier presented by the cardholder and directions different from the directions presented by the cardholder, forms a reply to the cardholder, which reply binds the identifier and directions presented, signs the formed reply, and presents the signed reply to the cardholder, the cardholder, having received the signed reply presented by the issuer, verifies the signature on the reply and checks that the signed reply binds the identifier and directions presented by the cardholder to the issuer, after which the cardholder reads the verifier from the card and presents the verifier to the issuer, who, having received the verifier, checks that the verifier presented by the cardholder corresponds to the identifier presented by the cardholder, thus completing the verification of validity of the card.

2. The method of claim 1, characterized in that when the cards are issued, the identifiers of the cards are chosen so that the probability that randomly chosen data coincide with the identifier of an issued card is less than some prescribed probability.

3. The method of claim 1, characterized in that one issues cards with identifier concealed, at least partly, by a masking device.

4. The method of claim 3, characterized in that one issues cards such that opening the masking device of the verifier of the card leads to opening the masking device of the identifier.

5. The method of claim 3, characterized in that when reading the identifier from the card, the cardholder opens one of the card masking devices, reads the data that were concealed by the opened masking device, and uses these data as an identifier.

6. The method of claim 1, characterized in that one issues cards consisting of several parts with additional data determining the correspondence between the parts of the card.

7. The method of claim 1, characterized in that when verifying the validity of the card using the identifier and directions presented by the cardholder, the issuer additionally checks that the presented identifier coincides with the identifier of an issued card.

8. The method of claim 1, characterized in that a digital signature is used to sign the formed reply.

9. The method of claim 1, characterized in that the identifier read from the card and the directions specifying fulfillment of the obligation associated with the card are presented to the issuer via electronic means of communication.

10. The method of claim 1, characterized in that the signed reply is presented to the cardholder via electronic means of communication.

11. The method of claim 1, characterized in that the verifier is presented to the issuer via electronic means of communication.

12. The method of claim 1, characterized in that when the cardholder presents to the issuer the identifier read from the card and the directions specifying fulfillment of the obligation associated with the card, the identifier and the directions are encrypted.

13. The method of claim 1, characterized in that when the cardholder presents to the issuer the identifier read from the card and the directions specifying fulfillment of the obligation associated with the card, the issuer is additionally presented with an encryption key, which the issuer uses for encrypting the signed reply to the cardholder.

14. The method of claim 1, characterized in that the directions specifying fulfillment of the obligation associated with the card include identification data of the entity additionally controlling fulfillment of the acknowledged obligation.

15. The method of claim 14, characterized in that the identification data of the entity additionally controlling fulfillment of the acknowledged obligation include a public key of the entity in a predetermined digital signature system.

16. The method of claim 1, characterized in that along with the verifier of the card, the cardholder repeatedly presents to the issuer the identifier of the card or a part of it.

17. The method of claim 1, characterized in that when verifying the validity of the card using the identifier and directions presented by the cardholder, the issuer additionally checks that the directions presented by the cardholder meets some predetermined criteria.

18. The method of claim 1, characterized in that when checking that the issuer has not earlier presented to anybody a signed reply binding the identifier presented by the cardholder and directions different from that presented by the cardholder, the issuer disregards any earlier presented reply if the signature on the reply has become invalid, and the obligation associated with the card whose identifier is bound to the directions by this reply is not acknowledged.

* * * * *